(12) United States Patent
Bierbaum et al.

(10) Patent No.: US 9,985,735 B1
(45) Date of Patent: May 29, 2018

(54) BROADCAST NEAR FIELD COMMUNICATION TO MOBILE DEVICE

(75) Inventors: Christopher J. Bierbaum, Overland Park, KS (US); Robin D. Katzer, Olathe, KS (US); Todd N. Koellner, Overland Park, KS (US); Kevin Zhu, Overland Park, KS (US)

(73) Assignee: SPRINT COMMUNICATIONS COMPANY L.P., Overland Park, KS (US)

(*) Notice: Subject to any disclaimer, the term of this patent is extended or adjusted under 35 U.S.C. 154(b) by 2593 days.

(21) Appl. No.: 11/696,603

(22) Filed: Apr. 4, 2007

(51) Int. Cl.
*H04H 60/09* (2008.01)
*G06Q 30/02* (2012.01)

(52) U.S. Cl.
CPC ......... *H04H 60/09* (2013.01); *G06Q 30/0207* (2013.01); *G06Q 30/0221* (2013.01)

(58) Field of Classification Search
CPC .............. G06Q 30/0207; G06Q 30/0221
USPC ................... 705/14, 1–28; 455/41.1
See application file for complete search history.

(56) References Cited

U.S. PATENT DOCUMENTS

| | | | |
|---|---|---|---|
| 2006/0179079 A1* | 8/2006 | Kolehmainen | 707/104.1 |
| 2006/0206582 A1* | 9/2006 | Finn | 709/217 |
| 2006/0208066 A1* | 9/2006 | Finn et al. | 235/380 |
| 2007/0073585 A1* | 3/2007 | Apple et al. | 705/14 |

OTHER PUBLICATIONS

Federal Communications Commission, 47 CFR § 73.1201, downloaded Nov. 12, 2014 from http://www.gpo.gov/fdsys/pkg/CFR-2012-title47-vol4/pdf/CFR-2012-title47-vol4-sec73-1201.pdf (herein §73.1201).*
Near field communication, from Wikipedia, dated Mar. 30, 2007, and downloaded Nov. 13, 2014 from http://en.wikipedia.org/w/index.php?title=Near_field_communication&oldid=119026809 (herein "NFC Wikipedia").*
Station identification, from Wikipedia, downloaded Nov. 12, 2014 from http://en.wikipedia.org/wiki/Station_identification (herein Station Identification).*

* cited by examiner

*Primary Examiner* — Scott D Gartland

(57) ABSTRACT

A broadcasting system having a transmitter that broadcasts a one-way signal is provided. The one-way signal is embedded with data that is transmitted to a device that is enabled with near field communication (NFC) technology. The NFC-enabled device may then transfer at least a portion of the transmitted embedded data to another NFC-enabled device by bringing the NFC-enabled devices into close proximity to each other.

18 Claims, 4 Drawing Sheets

Fig. 4
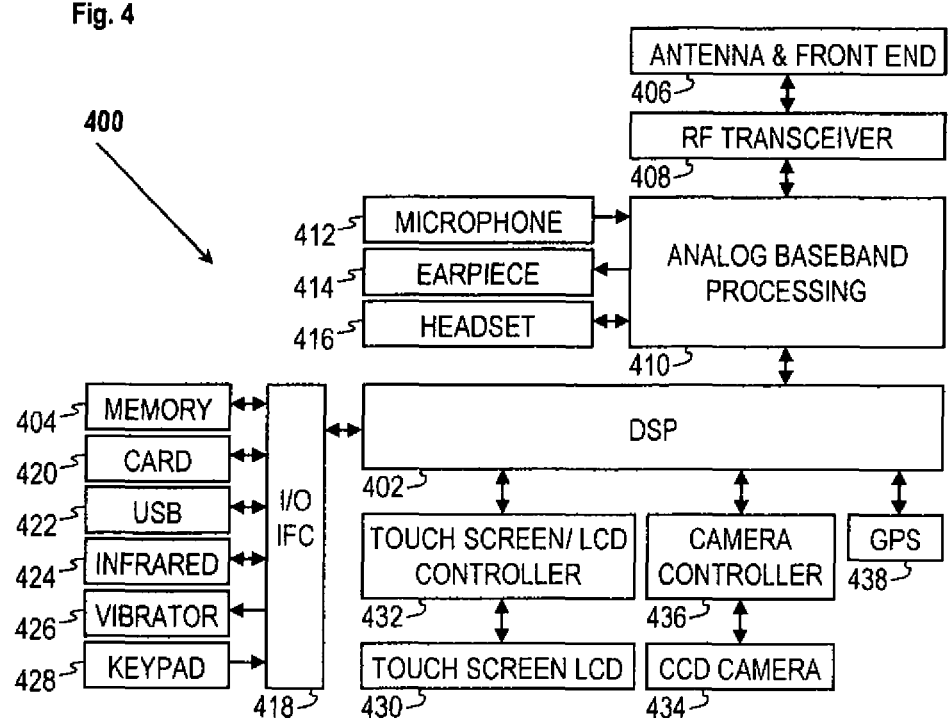
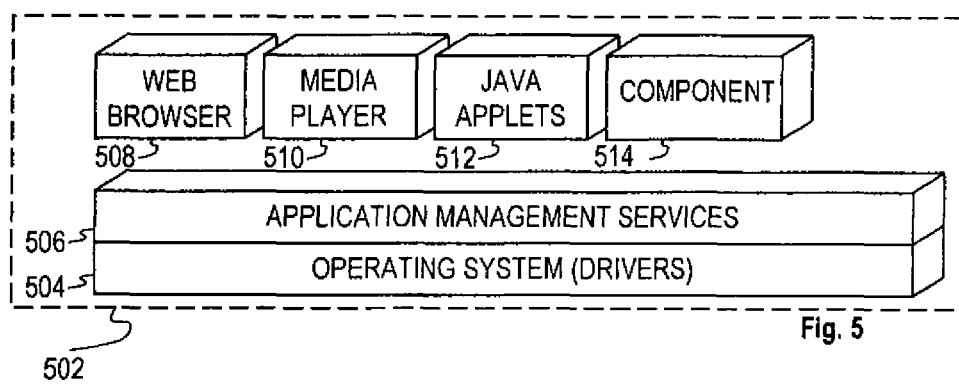
Fig. 5

BROADCAST NEAR FIELD COMMUNICATION TO MOBILE DEVICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Near Field Communication (NFC) is a short-range wireless technology that allows mobile devices to read information that may be stored on everyday objects. NFC may also enable data transfers between electronic devices that are within close range of each other. Broadcast media, such as television and radio, typically have a unidirectional flow of signal information and lack or have limited bidirectional communication with other electronic devices. Broadcast signals received by broadcast media or other devices may be encoded with embedded data.

SUMMARY

According to one embodiment, a broadcasting system is provided. The broadcasting system comprises a transmitter that broadcasts a one-way signal. The one-way signal has embedded data. A first device having a first near field communication (NFC) component receives the one-way signal with the embedded data. A second device having a second NFC component receives at least a portion of the embedded data via the second NFC component communicating with the first NFC component.

In another embodiment, a method of broadcasting is provided. The method broadcasts a one-way signal having an embedded portion to a first device having an NFC component. The first device processes the one-way signal and transmits at least a portion of the embedded data to a second NFC-enabled device.

In yet another embodiment, a mobile device having a software application and a NFC component is provided. A second NFC-enabled device receives a broadcast one-way signal containing embedded data. The NFC component on the mobile device receives at least a portion of the embedded data from the second NFC-enabled device. The software application on the mobile device executes and uses at least a portion of the embedded data in transactions.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 4 is a block diagram of the component of the handset depicted in FIG. 3;

FIG. 5 is a diagram of a software environment that may be implemented on a handset operable for some of the various embodiments of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In one embodiment, the present system provides a broadcaster that broadcasts a one-way signal that is received by a device, such as a television or radio. The broadcast one-way signal may carry embedded data that includes, for example, information related to the broadcast such as coupons, links, advertisements, or other information. The device that receives the broadcast one-way signal is provided with a component that supports NFC (near field communication) technology. A mobile device, such as a mobile handset, that is similarly equipped with an NFC component can communicate with the television or radio, via the NFC components on the respective devices, and receive the embedded data. The mobile device may then use the embedded data in various manners. For example, when the embedded information includes a coupon, the mobile device may use the coupon during a transaction.

Figure 1:
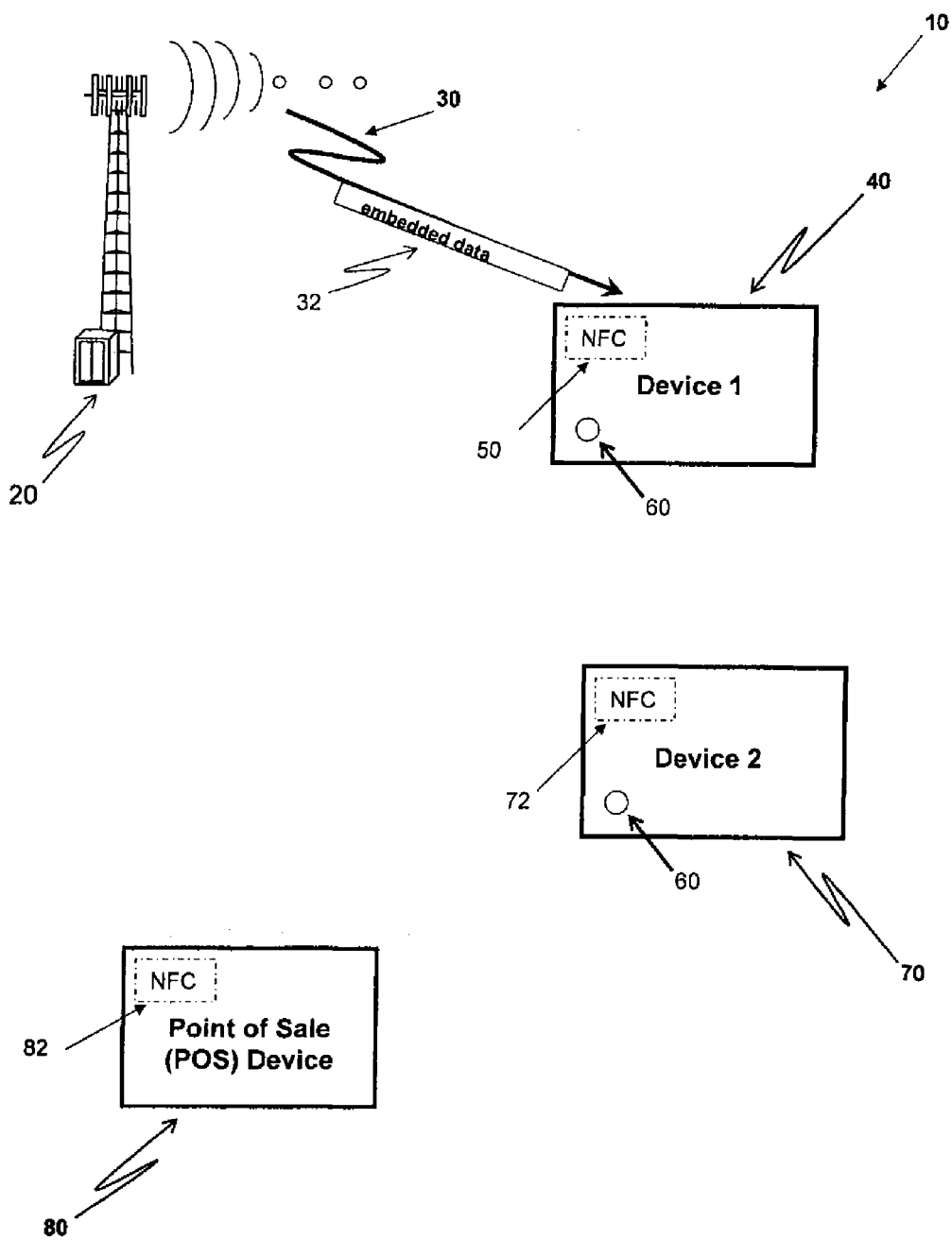
FIG. 1 illustrates one embodiment of a system for broadcasting a signal to a device having a near field communication component.

FIG. 1 illustrates a system 10 for broadcasting a signal to a device having a near field communication component. The system 10 includes a broadcaster 20 operable to broadcast a signal 30 to a first device 40, the first device 40 having a near field communication (NFC) component 50. The broadcaster 20 may be a radio or television station, a satellite TV or other radio broadcasts. The broadcast may also be an electronic broadcast transmitted over the Internet such as via IP or other protocols, cable companies or other systems, to the device 40. The broadcast signal is a one-way broadcast signal such as, but not limited to, one-way broadcasts from television and radio stations. The term one-way signal or broadcast, as used herein, refers to broadcasts that are substantially uni-directional. There may be, however, some limited capacity for the user of the first device 40 to select programming, such as is the case when selecting pay-per-view television or cable broadcasts. The broadcast transmissions include, but are not limited to movies, talk shows, comedies, television programs or other entertainment that may be usually provided to televisions or radios. The one-way broadcast signal does not have a substantial two-way aspect as may be the case with computer networks where there is substantial two-way communication and interaction between the devices.

In system 10, the first device 40 may be a television, a radio or other display or electronic presentation devices for presenting the broadcast signal such as a television or radio. In alternate embodiments, the first device 40 could be a PC workstation, laptop, or other computer system that is receiving the broadcast one-way signal. The NFC 50 is a well known near field communication component that is in communication with the first device 40. Although the NFC 50 is shown as a part of the first device 40, it will be appreciated that the NFC 50 may be integral to the first device 40 or connected or coupled to the first device 40 via cable or other connector well-known to one of ordinary skill in the art.

Although in this embodiment the devices, such as the first, second and POS devices 50, 70 and 80, are shown as provided with NFC type components for communication, other technologies may also be used and the present disclosure is not limited or restricted to NFC type components or NFC type communication. In other embodiments, the first, second, and POS devices 50, 70 and 80 may be provided with systems, such as radios or other components, for any type of peer-to-peer communication well known or after developed. The types of peer-to-peer systems and communication that might be used according to this disclosure include, but are not limited to, any of a variety of wireless, contact, or contact-less communication, including magnetic, optical, short range wireless communication, such as Bluetooth and Wi-Fi (802.11x), other wireless communications such as WiMAX (802.16), or still others, such as RFID (radio frequency identification) technologies, as well as NFC. As used herein, peer-to-peer communication refers to systems that typically do not have centralized network administration or administrators, and where the devices coordinate and communicate with each other in a more direct or indirect manner than in centralized networks such as cellular networks, including CDMA and GSM networks, or more conventional IP (Internet Protocol) computer networks.

The broadcast signal 30 is provided with embedded data 32. The embedded data 32 on the broadcast signal 30 may contain information about the broadcast signal 30, such as coupons, links to additional information about the broadcast, gift card or other transaction related information, promotional information about or related to the broadcast signals. For example, the broadcast may be a movie that is being shown on a particular channel that includes an advertisement for a product. The embedded data 32 might be a coupon for a reduced price for the purchase of the product or a specific dollar amount or some other rebate or incentive for the consumer to purchase the advertised product. The embedded data 32 may include other details about the broadcast signal that are of interest to, for example, advertisers or others. Other types of embedded data and purposes for the embedded data are described in U.S. patent application Ser. No. 11/617,707, filed Dec. 28, 2006, entitled "Contextual Multimedia Metatagging", herein incorporated by reference for all purposes.

When the broadcast signal 30 including the embedded data 32 is received by the first device 40, the first device 40 and/or the NFC 50 may detect the embedded data 32. The first device 40 may include an indicator 60 such as a light or speaker that may be activated to indicate the presence of the embedded data in the broadcast to a nearby viewer of the device. In one example, a user may be watching the first device 40, such as a television, and may note that the indicator 60 on the first device 40 is activated, e.g. the indicator 60 is lighted or emits sound, to signal the presence of data such as a coupon for an advertisement currently being shown on the television. Using a second device 70 that includes a second near field communication device (NFC) 72, the user might then obtain all or portions of the embedded data, including information derived from the embedded data.

The second device 70 may be a mobile handset, a mobile device, personal digital assistant, a laptop or tablet computer or other well known systems. The second NFC 72 and the NFC 50 may be a short range wireless technology used, for example, by mobile phones or other devices. NFC 50 and 72 may communicate according to an ECMA or other standards. In some embodiments, the NFC may operate by magnetic field induction or may operate using other wireless capabilities or standards which are well known in the art or would readily suggests themselves to one of ordinary skill in the art.

In another example, the user is watching a broadcast being shown on the user's TV, designated here as the first device 40. The television identifies the existence of embedded data 32 and activates the indicator 60 to signal the presence of the embedded data 32. With the indicator activated, the user may then bring the second device 70 into proximity with the television. The NFC 50 of the first device 40 may then transmit the embedded data 32 to the second NFC 72 on the second device 70. In other embodiments, the user's handset, such as the second device 70, might monitor the television or otherwise determine the existence of embedded data 32 at the television and then initiate communication to obtain the embedded data 32.

The embedded data 32 may include information related to the various applications or systems required to implement the embedded data. For example, a second device 70 that receives embedded data may host a suite of applications that may organize and assist the user in managing financial or other transactions related to the embedded data 32. If the embedded data included a gift card or other coupons, the embedded data 32 would also identify the appropriate application, such as an electronic wallet or briefcase, which could be used by the second device 70 to manage the gift card or coupon. The embedded data 32 may contain information in various formats for use on different devices and by different applications. However, only a portion of the embedded data 32 may be transmitted to or used by the NFC 72 and second device 70.

In yet another example, the user may be leaving the area of the first device 40, a television, but may be interested in continuing to view a particular television show or broadcast using the second device 70. In this instance, the user might bring the second device 70 and second NFC 72 into proximity with the first device 40 and its corresponding NFC 50. Embedded data 32 pertaining to the broadcast would then be exchanged between the NFC devices 50 and 72 respectively. In this example, the embedded data 32 could include tuning information, such as channel signaling or other tuning related information, that allows the second device 70 to obtain the broadcast 30 being shown on the first device 40. The embedded data 32 might also include information identifying the embedded data 32, such the name or title of a TV program or other broadcast. The embedded data 32 may also have the time and length of the broadcast, as well as other information. Following the exchange of data, the user might then leave the general vicinity with the second device 70, but would be able to continue to watch the broadcast 30 on the second device 70 since the second device 70 has obtained the appropriate tuning information to receive the channel or broadcast. The second device 70 might receive the broadcast 30 from the same or different broadcaster 20 via the same or other network or system.

Alternatively, if the second device 70 receives embedded data 32 that is transaction related information, the user of the second device 70 might take the second device 70 to a point of sale (POS) device 80, such as to a retailer or other vendor, and bring the second device 70 into communication with an NFC device 82 at the POS 80. The second device 70 may then use or redeem the transaction related information. Transaction related information may include, but is not limited to, coupons, gift card credits, vouchers, credits, certificates, debit information, currency, and other forms of tender that may be obvious to one skilled in the art. The embedded data 32 might also include other information, such as data authentication or links, used to locate and access related information on-line such as via an Internet web site.

Figure 2:
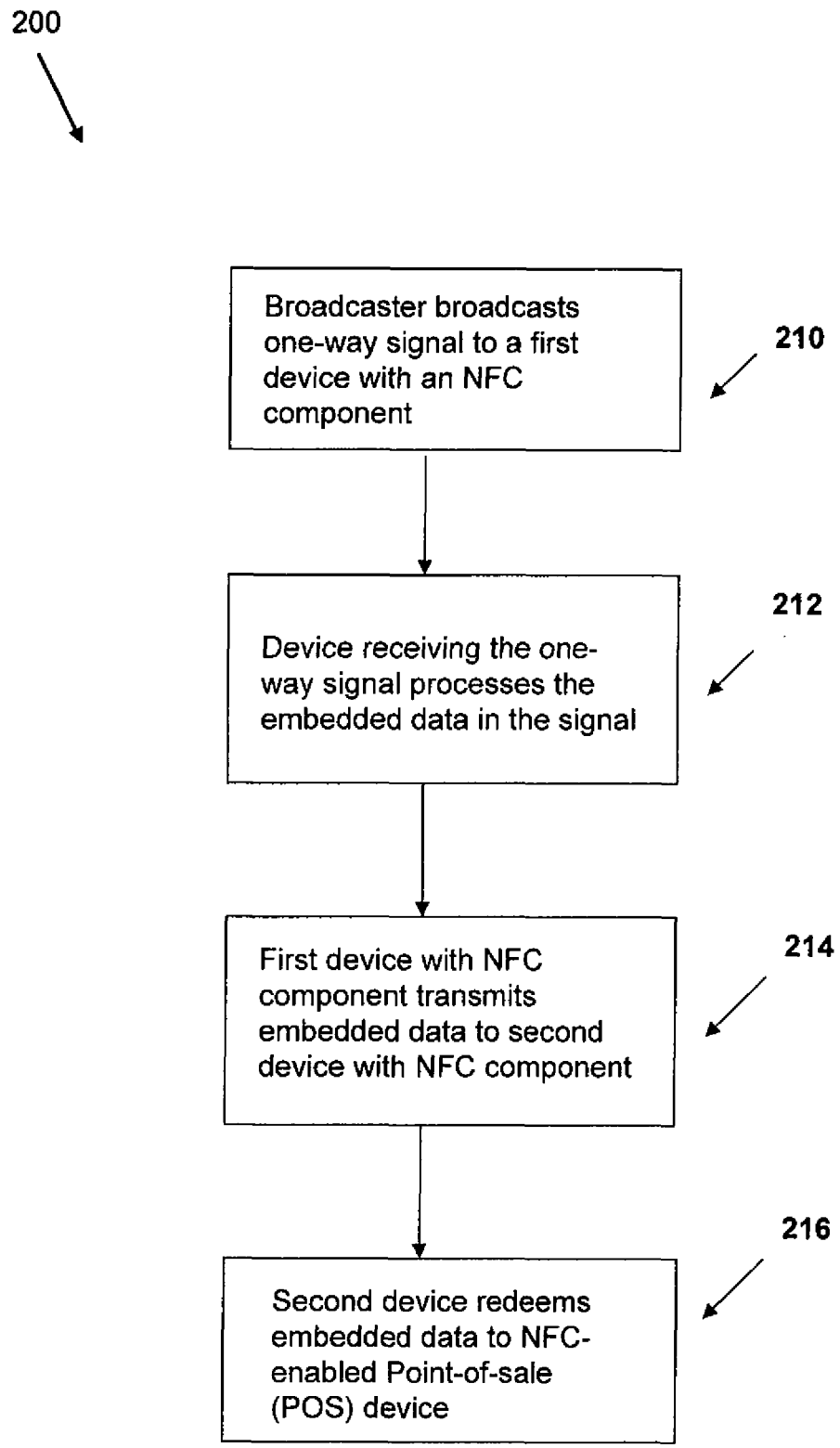
FIG. 2 is a flow chart of a method for broadcasting a signal to a device having a near field communication component.

FIG. 2 illustrates an embodiment of a method 200 for broadcasting. At block 210, a one-way electronic signal is broadcast to a first device having an NFC component. Broadcasts may contain live or pre-recorded audio, video, or other such data, and may be provided through broadcasters operable to transmit such content. The broadcast one-way signal may additionally include an embedded data portion. The embedded data portion could include information related to a coupon, gift card, certificate or other transaction information. At block 212, the embedded data is processed by the NFC component on the first device. The processing may help determine or identify the content of the embedded data. The content of the embedded data may indicate the purpose of the broadcast. For example, if the embedded data contains transaction information, it may require communication with a NFC-enabled point of sale (POS) device or other such transaction terminal that is similarly NFC-enabled. If the embedded data 32 contains tuning information, it may require communication with a mobile device, or other type of communication device, that has the ability to process tuning information.

At block 214, the first device 40 with the NFC component 50 transmits the embedded data to a second device 70 with a second NFC component 72. At block 216, transaction related information on the second NFC component may be redeemed at a POS device 80 enabled with NFC technology.

Figure 3:
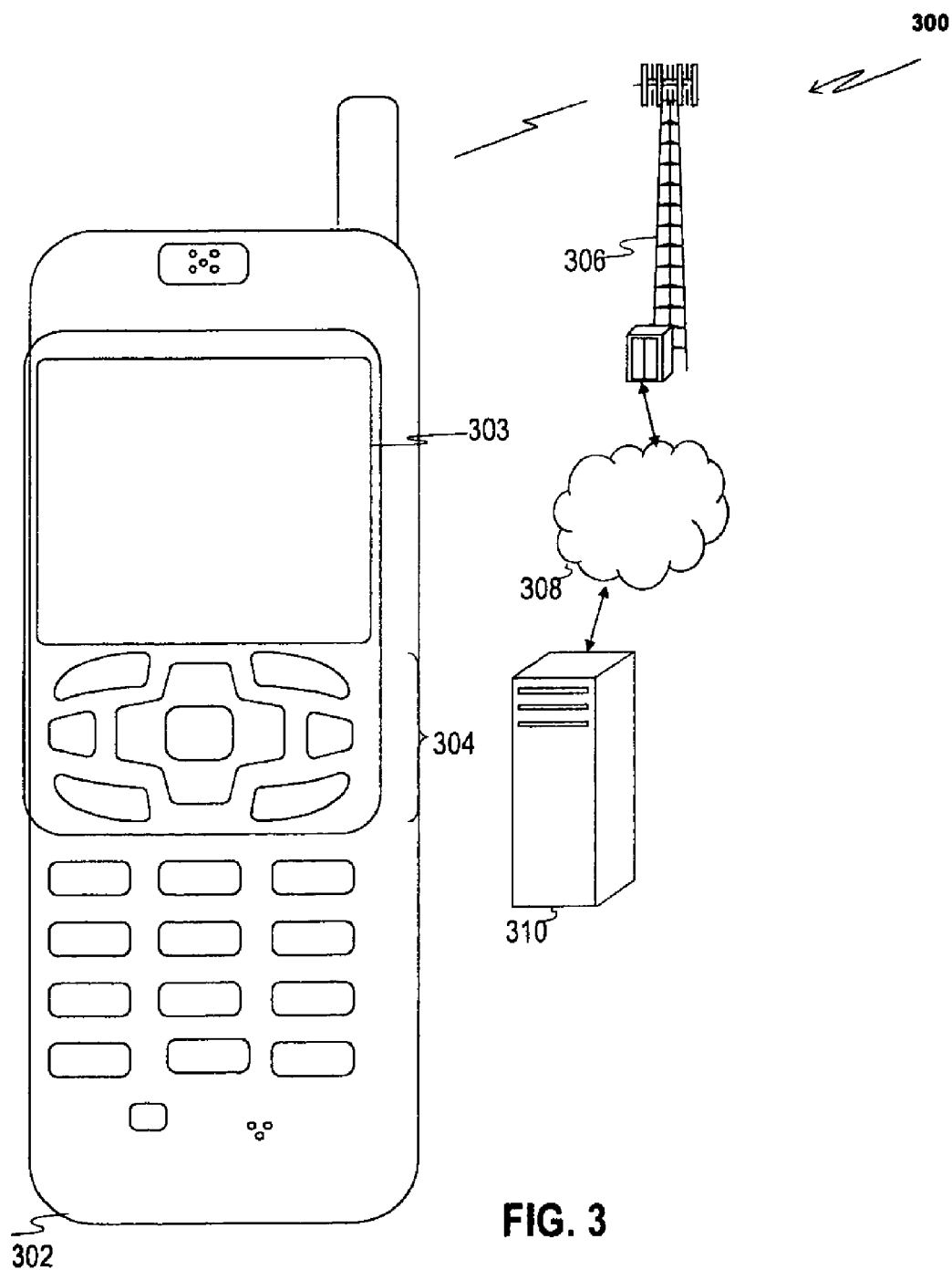
FIG. 3 is a diagram of a wireless communications system including a handset operable for some of the various embodiments of the disclosure.

FIG. 3 shows a wireless communications system 300 including the handset 302. FIG. 3 depicts the handset 302, which is operable for implementing aspects of the present disclosure, but the present disclosure should not be limited to these implementations. Though illustrated as a mobile phone, the handset 302 may take various forms including a wireless handset, a pager, a personal digital assistant (PDA), a portable computer, a tablet computer, or a laptop computer. Many suitable handsets combine some or all of these functions. In some embodiments of the present disclosure, the handset 302 is not a general purpose computing device like a portable, laptop or tablet computer, but rather is a special-purpose communications device such as a mobile phone, wireless handset, pager, or PDA.

The handset 302 includes a display 303 and a touch-sensitive surface or keys 304 for input by a user. The handset 302 may present options for the user to select, controls for the user to actuate, and/or cursors or other indicators for the user to direct. The handset 302 may further accept data entry from the user, including numbers to dial or various parameter values for configuring the operation of the handset. The handset 302 may further execute one or more software or firmware applications in response to user commands. These applications may configure the handset 302 to perform various customized functions in response to user interaction.

Among the various applications executable by the handset 302 are a web browser, which enables the display 303 to show a web page. The web page is obtained via wireless communications with a cell tower 306, a wireless network access node, or any other wireless communication network or system. The cell tower 306 (or wireless network access node) is coupled to a wired network 308, such as the Internet. Via the wireless link and the wired network, the handset 302 has access to information on various servers, such as a server 310. The server 310 may provide content that may be shown on the display 303.

FIG. 4 shows a block diagram of the handset 302. The handset 302 includes a digital signal processor (DSP) 402 and a memory 404. As shown, the handset 302 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438.

The DSP 402 or some other form of controller or central processing unit operates to control the various components of the handset 302 in accordance with embedded software or firmware stored in memory 404. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 302 to send and receive information from a cellular network or some other available wireless communications network. The RF transceiver 408 provides frequency shifting, converting received RF signals to baseband and converting baseband transmit signals to RF. The analog baseband processing unit 410 may provide channel equalization and signal demodulation to extract information from received signals, may modulate information to create transmit signals, and may provide analog filtering for audio signals. To that end, the analog baseband processing unit 410 may have ports for connecting to the built-in microphone 412 and the earpiece speaker 414 that enable the handset 302 to be used as a cell phone. The analog baseband processing unit 410 may further include a port for connecting to a headset or other hands-free microphone and speaker configuration.

The DSP 402 may send and receive digital communications with a wireless network via the analog baseband processing unit 410. In some embodiments, these digital communications may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the infrared port 424. The USB interface 422 may enable the handset 302 to function as a peripheral device to exchange information with a personal computer or other computer system. The infrared port 424 and other optional ports such as a Bluetooth interface or an IEEE 802.11 compliant wireless interface may enable the handset 302 to communicate wirelessly with other nearby handsets and/or wireless base stations.

The input/output interface 418 may further connect the DSP 402 to the vibrator 426 that, when triggered, causes the handset 302 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the handset 302. Another input mechanism may be the touch screen LCD 430, which may also display text and/or graphics to the user. The touch screen LCD controller 432 couples the DSP 402 to the touch screen LCD 430.

The CCD camera 434 enables the handset 302 to take digital pictures. The DSP 402 communicates with the CCD camera 434 via the camera controller 436. The GPS sensor 438 is coupled to the DSP 402 to decode global positioning system signals, thereby enabling the handset 302 to determine its position. Various other peripherals may also be included to provide additional functions, such as, for example, radio and television reception.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 302. Also shown in FIG. 5 are a web browser application 508, a media player application 510, and Java applets 512. The web browser application 508 configures the handset 302 to operate as a web browser, allowing a user to enter information into forms and select links to retrieve and view web pages. The media player application 510 configures the handset 302 to retrieve and play audio or audiovisual media. The Java applets 512 configure the handset 302 to provide games, utilities, and other functionality. A component 514 may be resident on the handset, servers, or both and may be operable to promote implementation of the present disclosure.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of broadcasting content with embedded data, comprising:
   receiving, by a first device, a first one-way broadcast of content from a first transmitter, the first one-way broadcast having embedded data that comprises tuning information;
   transmitting, by a first near field communication component of the first device to a second near field communication component of a second device, at least a portion of the embedded data including the tuning information;
   processing, by the second device, the tuning information; and
   in response to processing the turning information, receiving, by the second device, a second one-way broadcast of the content from a second transmitter.

2. The method of claim 1, further comprising redeeming, the second device, at least a portion of the embedded data in a transaction.

3. The method of claim 2, wherein the transaction is a point-of-sale transaction with a point of sale terminal.

4. The method of claim 1, wherein the embedded data further comprises data authentication to access information related to the embedded data via an Internet web site.

5. The method of claim 1, wherein the tuning information comprises at least one of a group of information consisting of: channel signaling information, a name or title of the broadcast, a time of the broadcast, and a length of the broadcast.

6. The method of claim 1, wherein, based on the tuning information, the second device is tuned to receive the second one-way broadcast from a different broadcaster than the broadcaster from which the first device receives the first one-way broadcast.

7. The method of claim 1, wherein, based on the tuning information, the second device is tuned to receive the second one-way broadcast from a different network than a network from which the first device receives the first one-way broadcast.

8. The method of claim 1, wherein, based on the tuning information, the second device is tuned to receive the second one-way broadcast from a different system than a system from which the first device receives the first one way broadcast.

9. The method of claim 1, wherein the first one-way broadcast is the same as the second one-way broadcast and the first transmitter is the same as the second transmitter.

10. The method of claim 1, wherein the embedded data received by the first device comprises information in various formats for use on different devices, and the second device receiving the at least the portion of the embedded data from the first device comprises receiving the at least the portion of the embedded data in a format of the second device.

11. The method of claim 1, wherein the second device is configured to continue to receive the second one-way broadcast based on the tuning information upon removal of the second device from the vicinity of the first device.

12. A method of broadcasting content with embedded data, comprising:

broadcasting, by a transmitter, a one-way broadcast of content, the one-way broadcast having embedded data that comprises at least one of an electronic coupon, an electronic gift card, or an electronic rebate and an identification of an appropriate application to implement the at least one of the electronic coupon, the electronic gift card, or the electronic rebate;

receiving, by a first device, the one-way broadcast with the embedded data from the transmitter, wherein the first device comprises a first near field communication (NFC) component;

receiving, via a second NFC component of a second device communicating with the first NFC component, at least a portion of the embedded data including the at least one of the electronic coupon, the electronic gift card, or the electronic rebate and the identification of the appropriate application;

using, by the second device, the appropriate application identified in the at least the portion of the embedded data to implement the at least one of the electronic coupon, the electronic gift card, or the electronic rebate; and redeeming, by the second device, the at least one of the electronic coupon, the electronic gift card, or the electronic rebate at a point of sale device.

13. The method of claim 12, wherein the one-way broadcast comprises at least a one-way video broadcast, a one-way audio broadcast, a one-way satellite video broadcast, or a one-way satellite audio broadcast.

14. The method of claim 12, wherein the first device is one of a television and radio, and the second device is one of a mobile device, a handset, and a personal digital assistant.

15. The method of claim 12, wherein the transmitter is one of a television broadcaster, a radio broadcaster, and a cable company.

16. The method of claim 12, wherein the first device comprises an indicator, the indicator indicating that the first NFC component on the first device has the embedded data.

17. The method of claim 12, wherein the embedded data further comprises data authentication to access information related to the embedded data via an Internet web site.

18. The method of claim 12, wherein the embedded data received by the first device comprises information in various formats for use on different devices, and the second device receiving the at least the portion of the embedded data from the first device comprises receiving the at least the portion of the embedded data in a format of the second device.

* * * * *